(12) United States Patent
Berkooz et al.

(10) Patent No.: US 12,205,421 B2
(45) Date of Patent: Jan. 21, 2025

(54) METHODS AND SYSTEMS FOR OPERATING A VEHICLE

(71) Applicant: ZF Friedrichshafen AG, Friedrichshafen (DE)

(72) Inventors: Gahl Berkooz, Ann Arbor, MI (US); Greg Yezersky, Farmington Hills, MI (US); Lev Levine, Charlotte, NC (US); Iris Maria Weiss, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 324 days.

(21) Appl. No.: 17/483,105

(22) Filed: Sep. 23, 2021

(65) Prior Publication Data

US 2023/0088087 A1 Mar. 23, 2023

(51) Int. Cl.
*G07C 5/08* (2006.01)
*B60K 35/00* (2006.01)
*B60K 6/22* (2007.10)
*B60K 35/28* (2024.01)

(52) U.S. Cl.
CPC ............ *G07C 5/0816* (2013.01); *B60K 35/00* (2013.01); *G07C 5/085* (2013.01); *B60K 6/22* (2013.01); *B60K 35/28* (2024.01); *B60K 2360/164* (2024.01); *B60K 2360/167* (2024.01); *B60K 2360/168* (2024.01); *B60K 2360/169* (2024.01); *B60K 2360/174* (2024.01); *B60Y 2200/92* (2013.01)

(58) Field of Classification Search
CPC ...... G07C 5/0816; G07C 5/085; B60K 35/00; B60K 6/22; B60K 2370/164; B60K 2370/167; B60K 2370/168; B60K 2370/169; B60K 2370/174; B60Y 2200/92; B60W 2510/244; B60W 50/0097; B60W 2510/305; B60W 2520/10; B60W 2520/105; B60W 2540/043; B60W 2540/30; B60W 2555/20; B60W 2556/50; B60W 50/14; B60W 20/12
USPC .......................................................... 701/37
See application file for complete search history.

(56) References Cited

U.S. PATENT DOCUMENTS

| | | | |
|---|---|---|---|
| 2017/0282738 A1* | 10/2017 | Miller | B60L 1/02 |
| 2018/0111598 A1* | 4/2018 | Jeong | B60W 10/06 |
| 2020/0284599 A1* | 9/2020 | Cyr | G01C 21/3469 |
| 2021/0031803 A1* | 2/2021 | Cussigh | B60W 50/082 |
| 2021/0114472 A1* | 4/2021 | Stephens | B60L 53/64 |

* cited by examiner

*Primary Examiner* — Yi-Kai Wang
(74) *Attorney, Agent, or Firm* — Dority & Manning, P.A.

(57) ABSTRACT

A method for operating a vehicle includes obtaining personal data associated with a user of the vehicle, obtaining operating data for the vehicle, determining a driver behavior recommendation to reduce emissions of the vehicle based at least in part on the personal data and the operating data, and presenting the driver behavior recommendation on an interface.

20 Claims, 5 Drawing Sheets

METHODS AND SYSTEMS FOR OPERATING A VEHICLE

FIELD OF THE INVENTION

The present subject matter relates generally to systems and methods for operating a vehicle, and, more particularly to systems and methods for operating a vehicle to assess and/or reduce an environmental impact of the vehicle.

BACKGROUND OF THE INVENTION

Emission standards for vehicles are increasing in many countries. For instance, the United States of America has adopted laws and regulations, such as the Clean Air Act and the Corporate Average Fuel Economy program, that set requirements for carbon dioxide emissions for OEM fleets, specify the methodology for calculating vehicle emissions, and establish specific allowed carbon dioxide emission limits as well as penalties for non-compliance. State governments, such as California, have also adopted regulations that establish (e.g., often stricter) emission requirements.

Hybrid electrical vehicles often operate more efficiently and with less emissions that conventional internal combustion engine vehicles. Hybrid vehicle drivetrains generally include an internal combustion engine as well as electric machine for propelling the hybrid vehicle. Within the drivetrain, power flow is switched between the internal combustion engine and the electric machine. Using the electric machine, e.g., in lieu of or in addition to the internal combustion engine, the emissions of the hybrid vehicle can be reduced relative to propelling the vehicle with only the internal combustion engine.

Switching between the internal combustion engine and the electric machine can be based on operating parameters of the hybrid vehicles. Thus, a driver may influence whether the internal combustion engine and/or the electric machine propels the hybrid vehicle by the way in which the driver operates the vehicle. Moreover, certain hybrid vehicles allow a driver to select the internal combustion engine or the electric machine to propel the vehicle.

Accordingly, improved systems and methods for operating a vehicle, e.g., in order to assess and/or reduce an environmental impact of the vehicle, would be useful.

BRIEF DESCRIPTION OF THE INVENTION

Aspects and advantages of the invention will be set forth in part in the following description, or may be apparent from the description, or may be learned through practice of the invention.

In an example embodiment, a computer-implemented method for operating a vehicle includes obtaining, with a computing system that comprises one or more computing devices, personal data associated with a user of the vehicle. The personal data includes user selected operating parameters for the vehicle. The method also includes obtaining, with the computing system, operating data for the vehicle. The operating data includes an operating status for one or more of a plurality of systems of the vehicle and an operating condition for the vehicle. The method further includes determining, by the computing system, a driver behavior recommendation to reduce emissions of the vehicle based at least in part on the personal data and the operating data and presenting the driver behavior recommendation on an interface.

In a first example aspect, the personal data may be stored within a memory of the computing system.

In a second example aspect, the personal data includes a status of one or more windows of the vehicle at a respective ambient temperature and/or vehicle speed.

In a third example aspect, the personal data includes a status of an air conditioning system of the vehicle at a respective ambient temperature.

In a fourth example aspect, the personal data includes a status of a cabin heating system of the vehicle at a respective ambient temperature.

In a fifth example aspect, the personal data includes a status of one or more seat heaters of the vehicle at a respective ambient temperature.

In a sixth example aspect, the personal data includes an average velocity of the vehicle.

In a seventh example aspect, the personal data includes an average selected cruise control velocity of the vehicle.

In an eighth example aspect, the personal data includes an average acceleration of the vehicle.

In a ninth example aspect, the operating data includes a current operating status for one or more of system of the vehicle.

In a tenth example aspect, the operating data includes one or more of an ambient temperature, a location of the vehicle, a time of day, and a weather forecast.

In an eleventh example aspect, determining the driver behavior recommendation includes determining, by the computing system, a user preferred operating condition of the vehicle from the personal data, identifying, by the computing system, a current operating condition of the vehicle from the operating data, and selecting, by the computing system, the driver behavior recommendation to reduce a difference between the user preferred operating condition and the current operating condition. Adjusting operation of the vehicle from the current operating condition to the user preferred operating condition reduces emissions of the vehicle.

In a twelfth example aspect, determining the driver behavior recommendation includes determining, by the computing system, the driver behavior recommendation to reduce operation of the internal combustion engine.

In a thirteenth example aspect, the interface includes one or both of an infotainment monitor and a speaker within the vehicle.

In a fourteenth example aspect, the interface includes a software application on a driver computing device.

In a fifteenth example aspect, the driver behavior recommendation includes one or more of adjusting a speed of the vehicle, adjusting an operating state of an air conditioning system, adjusting an operating state of a seat heater, adjusting an operating state of a cabin heating system, adjusting an operating state of a window, and switching the power flow from the internal combustion engine to the electric machine.

Each of the example aspects recited above may be combined with one or more of the other example aspects recited above in certain embodiments. For instance, all of the fifteen example aspects recited above, i.e., the first through fifteenth examples aspects, may be combined with one another in some embodiments. As another example, any combination of two, three, four, five, or more of the fifteen example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 1:
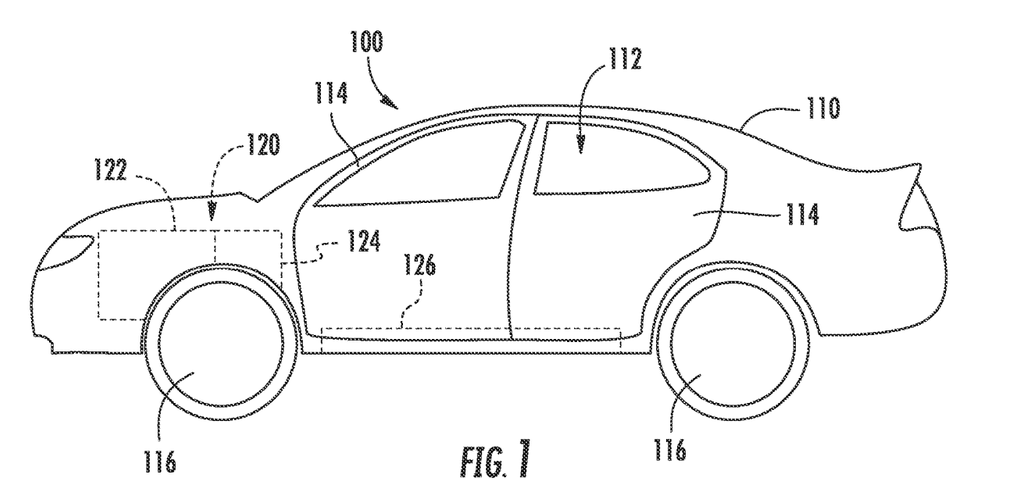
FIG. 1 is a side, elevation view of a passenger vehicle according to an example embodiment of the present subject matter.
Figure 2:
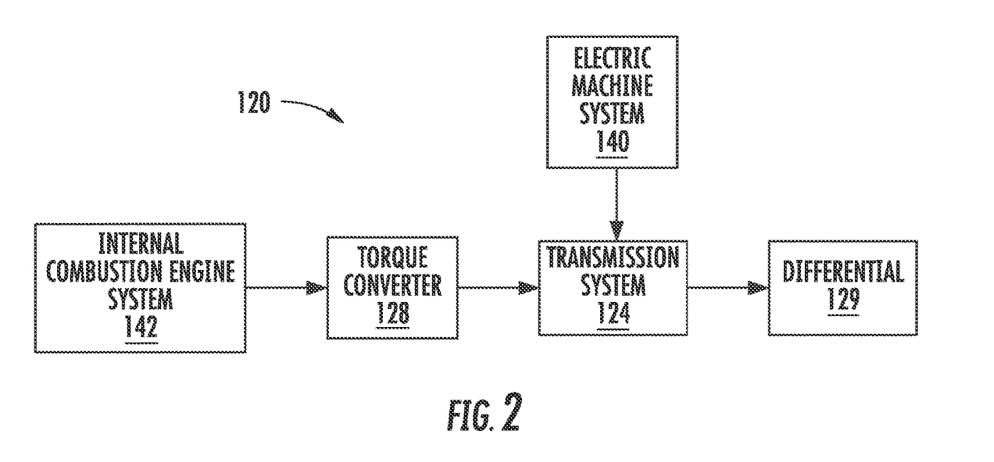
FIG. 2 is a schematic view of a drivetrain of the example vehicle of FIG. 1.

FIG. 1 is a side, elevation view of a passenger vehicle 100 according to an example embodiment. FIG. 2 is a schematic view of a drivetrain system 120 of passenger vehicle 100. As shown in FIG. 1, passenger vehicle 100 is illustrated as a sedan. However, passenger vehicle 100 in FIG. 1 is provided as an example only. For instance, passenger vehicle 100 may be a coupe, a convertible, a truck, a van, a sports utility vehicle, etc. in alternative example embodiments. In addition, while described below in the context of passenger vehicle 100, it will be understood that the present subject matter may be used in or with any other suitable vehicles, including commercial vehicles, such as tractor-trailers, buses, box trucks, farm vehicles, construction vehicles, etc., in other example embodiments.

Passenger vehicle 100 may include a body 110 rolls on wheels 116 during driving of passenger vehicle 100. Body 110 that defines an interior cabin 112, and a driver and passengers may access interior cabin 112 via doors 114 and sit within interior cabin 112 on seats (not shown). Within body 110, passenger vehicle 100 may also include various systems, including a motor system 122, a transmission system 124, an electrical accumulator/storage system 126, etc., for operating passenger vehicle 100.

In general, motor system 122, transmission system 124, and electrical accumulator system 126 may be configured in any conventional manner. For example, motor system 122 may include prime movers, such as an electric machine system 140 and an internal combustion engine system 142 (FIG. 2), that are operatable to propel passenger vehicle 100. Thus, passenger vehicle 100 may be referred to as a hybrid vehicle. Motor system 122 may be disposed within body 110 and may be coupled to transmission system 124. Transmission system 124 is disposed within power flow between motor system 122 and wheels 116 of passenger vehicle 100. In certain example embodiments, a torque converter 128 may be disposed in the power flow between internal combustion engine system 142 and transmission system 124 within drivetrain system 120. Transmission system 124 is operative to provide various speed and torque ratios between an input and output of the transmission system 124. Thus, e.g., transmission system 124 may provide a mechanical advantage to assist propulsion of passenger vehicle 100 by motor system 122. A differential 129 may be provided between transmission system 124 and wheels 116 to couple transmission system 124 and wheels 116 while also allowing relative rotation between wheels 116 on opposite sides of body 110.

Electric machine system 140 may be selectively operable as either a motor to propel passenger vehicle 100 or as a generator to provide electrical power, e.g., to electrical accumulator system 126 and other electrical consumers of passenger vehicle 100. Thus, e.g., electric machine system 140 may operate as a motor in certain operating modes of passenger vehicle 100, and electric machine system 140 may operate as generator in other operating modes of passenger vehicle 100. Electric machine system 140 may disposed within drivetrain system 120 in various arrangements. For instance, electric machine system 140 may be provided as a module in the power flow path between internal combustion engine system 142 and transmission system 124. As another example, electric machine system 140 may be integrated within transmission system 124.

Electrical accumulator system 126 may include one or more batteries, capacitors, etc. for storing electrical energy. Electric machine system 140 is coupled to electrical accumulator system 126 and may be selectively operable to charge electrical accumulator system 126 when operating as a generator and to draw electrical power from electrical accumulator system 126 to propel passenger vehicle 100 when operating as a motor.

A braking system (not shown) is operable to decelerate passenger vehicle 100. For instance, the braking system may include friction brakes configured to selectively reduce the rotational velocity of wheels 116. The braking system may also be configured to as a regenerative braking system that converts kinetic energy of wheels 116 into electric current. Operation of motor system 122, transmission system 124, electrical accumulator system 126, and the braking system are well known to those skilled in the art and not described in extensive detail herein for the sake of brevity.

Figure 3:
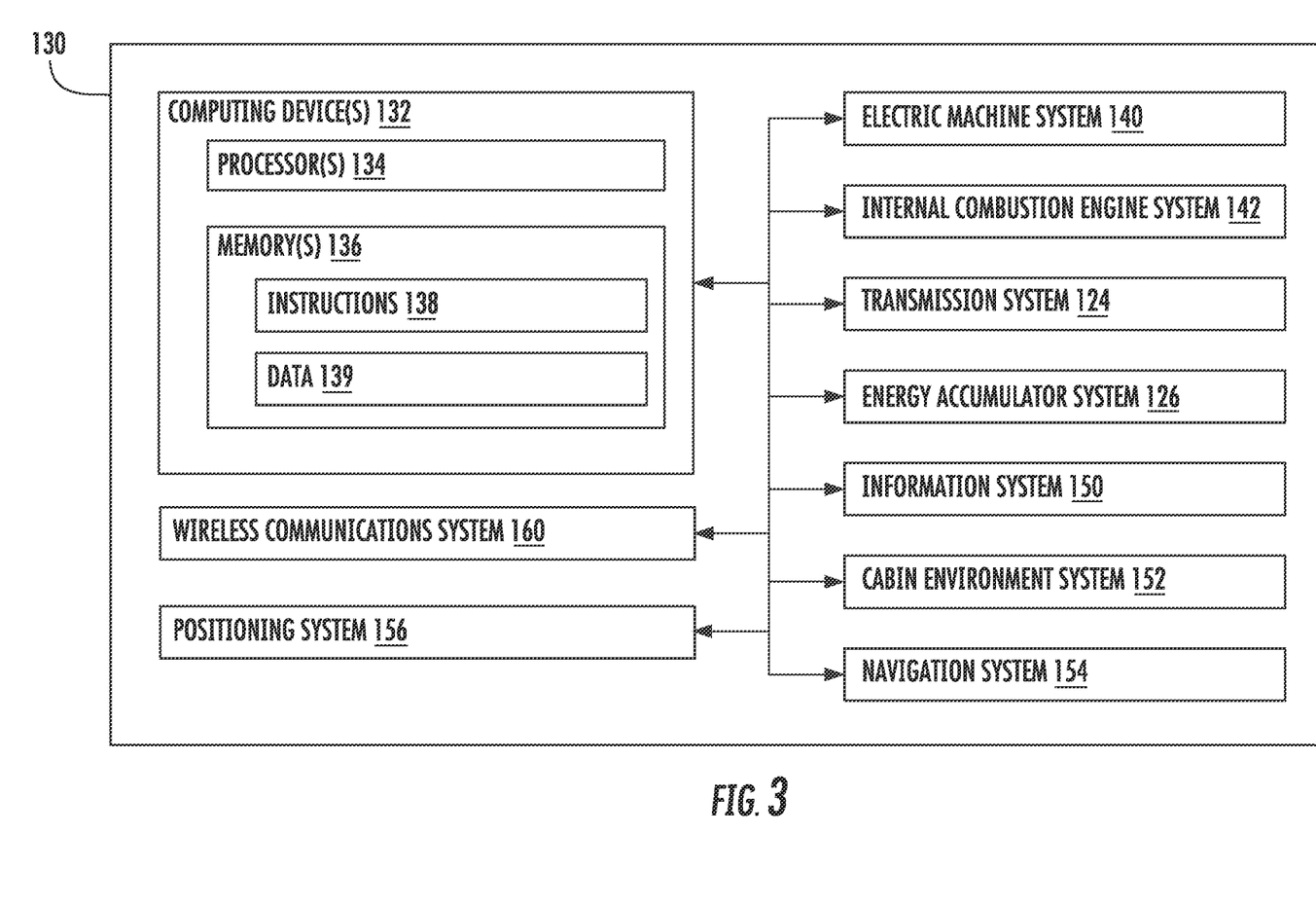
FIG. 3 is a schematic view of an example control system of the vehicle of FIG. 1 according to an example embodiment of the present subject matter.

FIG. 3 is a schematic view of certain components of a control system 130 suitable for use with passenger vehicle 100. In general, control system 130 is configured to control operation of passenger vehicle 100 and components therein. Control system 130 may facilitate operation of passenger vehicle 100 in various operating modes. For instance, control system 130 may be configured to operate passenger vehicle 100 in any one of a conventional mode, an electric mode, a hybrid mode, and a regeneration mode. In the conventional mode, passenger vehicle 100 is propelled only by internal combustion engine system 142. Conversely, passenger vehicle 100 is propelled only by electrical machine system 140 in the electric mode. The conventional mode may provide passenger vehicle 100 with an extended operating range relative to the electric mode, and passenger vehicle 100 may be quickly refilled at a fueling station to allow continued operation of passenger vehicle 100 in the conventional mode. Conversely, the emissions of passenger vehicle 100 may be significantly reduced in the electric mode relative to the conventional mode, and a fuel efficiency of passenger vehicle 100 may increase significantly in the electric mode as compared to the conventional mode. In the hybrid mode, passenger vehicle 100 may be propelled by both electrical machine system 140 and internal combustion engine system 142. In the regeneration mode, electrical machine system 140 may charge electrical accumulator system 126, e.g., and internal combustion engine system 142 may propel passenger vehicle 100. The various operating modes of passenger vehicle 100 are well known to those skilled in the art and not described in extensive detail herein for the sake of brevity.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of passenger vehicle 100. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors of various systems of passenger vehicle 100, including motor system 122 (e.g., electrical machine system 140 and internal combustion engine system 142), transmission system 124, electrical accumulator system 126, etc. In FIG. 3, the processor(s) 134, memory(ies) 136, and other elements of computing device(s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Computing device(s) 132 may be configured for communicating with various components of passenger vehicle 100. For example, computing device(s) 132 may be in operative communication with various systems of passenger vehicle 100, including motor system 122 (e.g., electrical machine system 140 and internal combustion engine system 142), transmission system 124, electrical accumulator system 126, etc. For instance, computing device(s) 132 may particularly be in operative communication with an engine control unit (ECU) (not shown) of motor system 122 and a transmission control unit (TCU) (not shown) of transmission system 124. Computing device(s) 132 may also be in operative communication with other systems of passenger vehicle 100, including a passenger/driver information system 150, e.g., that includes one or mode display(s), speaker(s), gauge(s), etc. within interior cabin 112 for providing information regarding operation of passenger vehicle 100 to a passenger/driver, a cabin environment system 152 for modifying the temperature of interior cabin 112, e.g., via air conditioning, heating, etc., a navigation system 154 for navigating passenger vehicle 100 to a destination, and/or a positioning system 156 for determining a current location (e.g., GPS coordinates) of passenger vehicle 100. Computing device(s) 132 may be configured to control system(s) 122, 124, 126 based at least in part on inputs received from an operator via a user interface (not shown), which may include one or more of a steering wheel, a gas pedal, a clutch pedal, a brake pedal, turn signal lever, hazard light switch, and/or the like.

Control system 130 may also include a wireless communication system 160 assists with wireless communication with other systems. For instance, wireless communication system 160 may wirelessly connect control system 130 with one or more other vehicles, buildings, etc. directly or via a communication network. Wireless communication system 160 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 122, 124, 126, 140, 142 within passenger vehicle 100 may be wired and/or wireless. As a particular example, systems within passenger vehicle 100 may be connected and communicate via a CAN bus.

As a hybrid vehicle, passenger vehicle 100 can operate with less emissions than a convention vehicle driven solely by an internal combustion engine. Passenger vehicle 100 can be propelled both by internal combustion engine system 142 as well as electric machine system 140 using electrical accumulator system 126 as an electrical power source. Power flow within passenger vehicle 100 may be selectively switchable between internal combustion engine system 142 and electric machine system 140. For example, the driver of passenger vehicle 100 may choose between internal combustion engine system 142 and electric machine system 140 as the prime mover for passenger vehicle 100 and switch between the two power sources on demand. Increased usage of electric machine system 140 and decreasing usage of internal combustion engine system 142 can advantageously reduce carbon dioxide emissions in passenger vehicle 100. However, drivers frequently miss opportunities to switch from internal combustion engine system 142 to electric machine system 140 and thus contribute to more environmentally friendly operation of passenger vehicle 100. Certain aspects of the present subject matter encourage driving behavior that reduces operation of internal combustion engine system 142 and increases operation of electric machine system 140 in order to contribute to more environmentally friendly operation of passenger vehicle 100.

Figure 4:
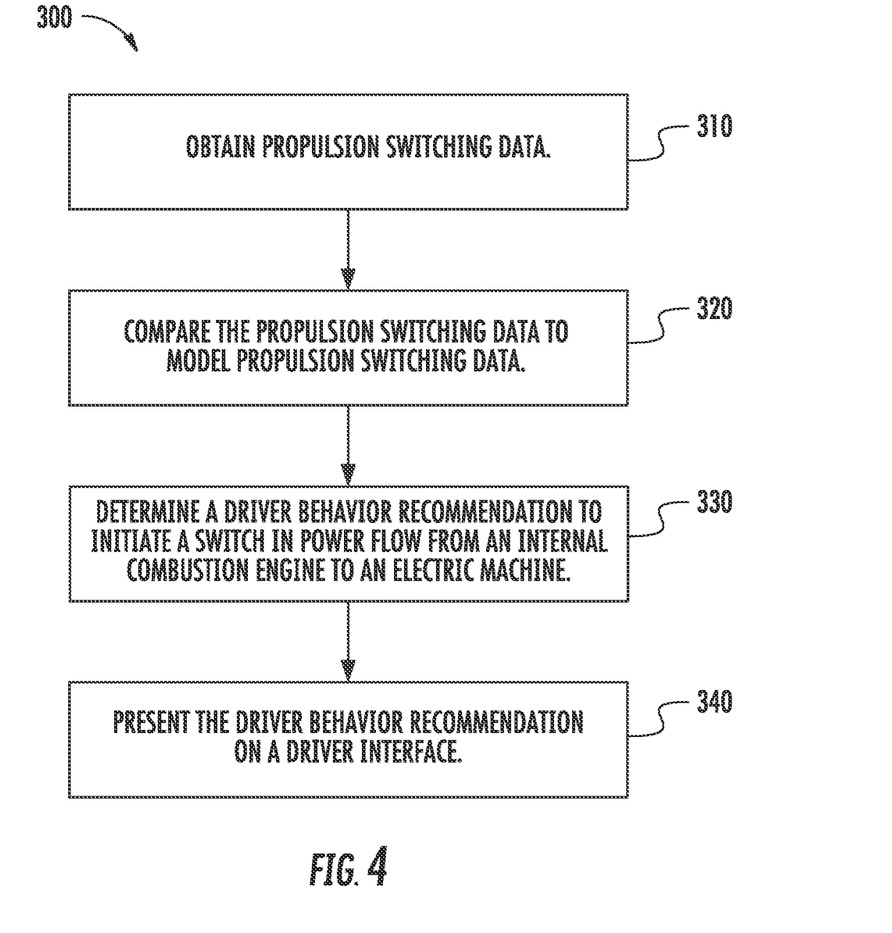
FIG. 4 is a flow diagram of a method for operating a hybrid vehicle according to an example embodiment of the present subject matter.

Referring now to FIG. 4, a flow diagram of a method 300 for operating a hybrid vehicle is illustrated. Method 300 will generally be described with reference to passenger vehicle 100 described with reference to FIGS. 1 and 2, and control system 130 described with reference to FIG. 3. For instance, method 300 may be at least partially executed by computing device(s) 132 of control system 130. However, method 300 may be suitable for use with any other suitable type of vehicle, control system configuration, and/or vehicle system. In addition, although FIG. 4 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 310, method 300 includes obtaining propulsion switching data. The propulsion switching data may be descriptive of a state of one or more vehicle systems for switching power flow of internal combustion engine system 142 and electric machine system 140. As an example, at 310, control system 130 may receive propulsion switching data from various systems of passenger vehicle 100, including internal combustion engine system 142, electric machine system 140, transmission system 124, electrical accumulator system 126, cabin environment system 154, navigation system 156, positioning system 156, etc. via a CAN bus of passenger vehicle 100. Thus, propulsion switching data may be obtained from any system of passenger vehicle 100 that contributes to switching propulsion of passenger vehicle 100 between internal combustion engine system 142 and electric machine system 140. As a particular example, speed and/or temperature sensors within internal combustion engine system 142, electric machine system 140, and/or transmission system 124 may transmit propulsion switching data to control system 130 at 310. As another example, temperature readings and/or charge state signals from electrical accumulator system 126 may be transmitted as propulsion switching data to control system 130 at 310. As more examples, navigation system 156 may transmit a destination for passenger vehicle 100 to control system 130 as propulsion switching data at 310, and positioning system 156 may transmit a current location of passenger vehicle 100 to control system 130 as propulsion switching data at 310. Further, cabin environment system 152 may also transmit a current air conditioning and/or heater operating state to control system 130 as propulsion switching data at 310. The various sensor data and/or operating states of the systems of passenger vehicle 100 may impact the selection of the power source of passenger vehicle 100 between internal combustion engine system 142 and electric machine system 140. Thus, obtaining the propulsion switching data at 310 may assist with switching from internal combustion engine system 142 to electric machine system 140, e.g., in order to reduce emissions and/or efficiently operate passenger vehicle 100, as described in greater detail below.

At 320, method 300 includes comparing the propulsion switching data to model propulsion switching data. The model propulsion switching data may be descriptive of a model state of the one or more vehicle systems when switching power flow from internal combustion engine system 142 to electric machine system 140 is desirable. For instance, the model propulsion switching data may correspond to a conditions when switching power flow from internal combustion engine system 142 to electric machine system 140 reduces emissions and/or more efficiently operates passenger vehicle 100. The model propulsion switching data may be calculated, gathered, or otherwise provided by a manufacturer of passenger vehicle 100 and/or drivetrain system 120. At 320, control system 130 may compare the propulsion switching data to the model propulsion switching data. For example, the model propulsion switching data may be saved within the one or more memories 136 of control system 130, and control system 130 may retrieve the model propulsion switching data from the one or more memories 136 at 320. As another example, the model propulsion switching data may be saved within a remote server, e.g., of the manufacturer of passenger vehicle 100 and/or drivetrain system 120, and control system 130 may retrieve the model propulsion switching data from the remote server via wireless communication system 160.

In certain example embodiments, by comparing the propulsion switching data to the model propulsion switching data at 320, control system 130 may establish whether the actual operating state of passenger vehicle 100 is optimal with respect to emissions and/or efficiency. Thus, e.g., control system 130 may determine that passenger vehicle 100 may be operated more efficiently by switching from internal combustion engine system 142 to electric machine system 140 for propulsion of passenger vehicle 100 based upon the difference between the propulsion switching data from 310 and the model propulsion switching data. In particular, when the propulsion switching data from 310 is different than the model propulsion switching data by less than a threshold, control system 130 may determine that passenger vehicle 100 is operating efficiently with internal combustion engine system 142 for propulsion of passenger vehicle 100. Conversely, control system 130 may determine that passenger vehicle 100 may operate more efficiently by switching from internal combustion engine system 142 to electric machine system 140 for propulsion of passenger vehicle 100 when the propulsion switching data from 310 is different than the model propulsion switching data by more than the threshold.

At 330, method 300 includes determining a driver behavior recommendation to initiate a switch in the power flow from internal combustion engine system 142 to electric machine 140, e.g., when the propulsion switching data from 310 is different than the model propulsion switching data by more than the threshold. The driver of passenger vehicle 100 may take various actions to assist with switching from internal combustion engine system 142 to electric machine system 140 for propulsion of passenger vehicle 100. For instance, the driver may decrease a speed of passenger vehicle 100, may adjust cabin environment system 152 to decrease energy consumption of cabin environment system 152, may plug passenger vehicle 100 into a charging station upon arrival at a destination to charge electrical accumulator system 126, may schedule servicing of electrical accumulator system 126, may command switching from internal combustion engine system 142 to electric machine system 140, etc. Control system 130 may determine the driver behavior recommendation in order to increase the usage of electric machine system 140 and decrease the usage of internal combustion engine system 142 when the driver of passenger vehicle 100 implements the driver behavior recommendation.

At 340, method 300 includes presenting the driver behavior recommendation from 330 on an interface. For example, control system 130 may present the driver behavior recommendation on information system 150. In particular, the driver behavior recommendation may be presented visually on a display of information system 150, audibly on a speaker of information system 150, and/or in any other suitable manner to inform the driver of passenger vehicle 100 of the driver behavior recommendation via information system 150. As another example, control system 130 may transmit the driver behavior recommendation to a computing device, such as a smartphone or tablet, via wireless communication system 160. For instance, a software application on the computing device of the driver may visually present the driver behavior recommendation on a display of the computing device, audibly present the driver behavior recommendation on a speaker of the computing device, etc.

As noted above, the driver behavior recommendation can encourage the driver of passenger vehicle 100 to take actions which encourage switching from internal combustion engine system 142 to electric machine system 140 for propulsion of passenger vehicle 100. Thus, based at least in part on the driver behavior recommendation from 340, the driver of passenger vehicle 100 may adjust operation of passenger vehicle 100 to increase the usage of electric machine system 140 and decrease the usage of internal combustion engine system 142. For instance, the driver may decrease the speed of passenger vehicle 100, may adjust cabin environment system 152 to decrease energy consumption of cabin environment system 152, may plug passenger vehicle 100 into a charging station, may schedule servicing of electrical accumulator system 126, may command switching from internal combustion engine system 142 to electric machine system 140, etc. in response to receipt of the driver behavior recommendation. In certain example embodiments, the driver behavior recommendation may be automatically implemented by control system 130 unless the driver opts out of the driver behavior recommendation.

It will be understood that while described above in the context of a hybrid vehicle, certain aspects of the present subject matter may be used with conventional internal combustion powered vehicles to reduce emissions and save fuel. For instance, emission data from vehicle systems may be collected via a CAN bus and compared to model data. A driver behavior recommendation for reducing fuel consumption may be developed based upon the difference between the collected data and the model data, and the driver behavior recommendation may be presented to the driver encourage environmentally friendly driving.

Figure 5:
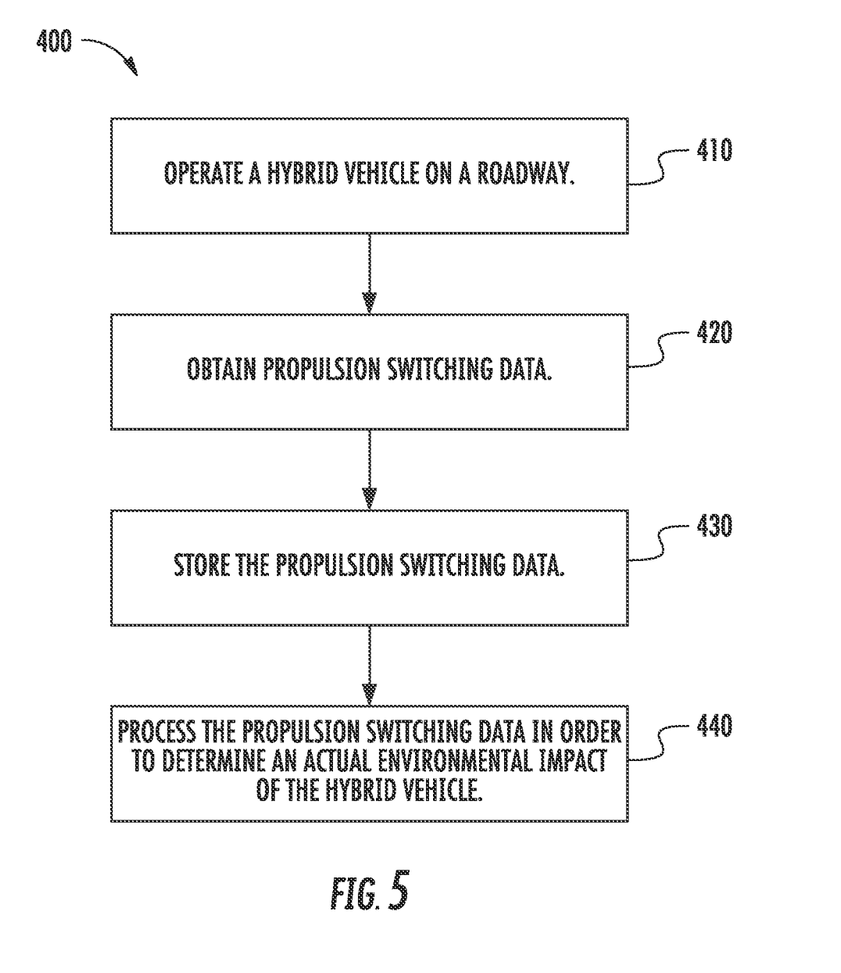
FIG. 5 is a flow diagram of a method for operating a hybrid vehicle according to another example embodiment of the present subject matter.

Referring now to FIG. 5, a flow diagram of a method 400 for operating a hybrid vehicle is illustrated. Method 400 will generally be described with reference to passenger vehicle 100 described with reference to FIGS. 1 and 2, and control system 130 described with reference to FIG. 3. For instance, method 400 may be at least partially executed by computing device(s) 132 of control system 130. However, method 400 may be suitable for use with any other suitable type of vehicle, control system configuration, and/or vehicle system. In addition, although FIG. 5 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 410, method 400 includes operating passenger vehicle 100 on a roadway. Thus, e.g., a driver may operate passenger vehicle 100 such that internal combustion engine system 142 and/or electric machine system 140 propel passenger vehicle 100 along the roadway. Accordingly, passenger vehicle 100 may be operating to convey the driver, one or more passengers, and/or cargo to a destination at 410. Passenger vehicle 100 may not be undergoing regulatory emissions testing within a controlled setting at 410 but rather may be operated in a normal, day-to-day manner.

At 420, method 400 includes obtaining propulsion switching data while passenger vehicle 100 is traveling on the roadway. The propulsion switching data is descriptive of a state of one or more vehicle systems for switching power flow of internal combustion engine system 142 and electric machine system 140. As an example, at 420, control system 130 may receive propulsion switching data from various systems of passenger vehicle 100, including internal combustion engine system 142, electric machine system 140, transmission system 124, electrical accumulator system 126, navigation system 156, positioning system 156, etc. via a CAN bus of passenger vehicle 100. Thus, propulsion switching data may be obtained from any system of passenger vehicle 100 that contributes to switching propulsion of passenger vehicle 100 between internal combustion engine system 142 and electric machine system 140. At 420, control system 130 may obtain the propulsion switching data over a regulatory operating interval, such as a predetermined distance. Thus, e.g., the period or interval over which propulsion switching data is obtained while passenger vehicle 100 is traveling on the roadway may correspond to a distance or time period defined by regulatory testing requirements, e.g., despite not operating passenger vehicle 100 under testing conditions bur rather in a normal, day-to-day manner.

As a particular example, the propulsion switching data may include a start time of passenger vehicle 100 operating on the roadway at 410, an end time of passenger vehicle operating on the roadway at 410, a speed of passenger vehicle 100 while operating on the roadway at 410, an average speed of passenger vehicle 100 while operating on the roadway at 410, a total operating time of passenger vehicle 100 while operating on the roadway at 410, an interval of uninterrupted operation (e.g., of internal combustion engine system 142 and/or electric machine system 140) while operating on the roadway at 410, and a switch time between internal combustion engine system 142 and the electric machine system 140 while operating on the roadway at 410. The propulsion switching data may also include an average fuel consumption rate while operating on the roadway at 410, a distance traveled by passenger vehicle while operating on the roadway at 410, the operating status of cabin environment system 152 (such as a current air conditioning and/or heater operating state), an exterior temperature about passenger vehicle 100, a charge status of electrical accumulator system 126, etc. Thus, obtaining the propulsion switching data at 420 may assist with obtaining actual emissions and/or efficiency data for passenger vehicle 100.

At 430, method 400 includes storing the propulsion switching data. For example, the propulsion switching data may be saved within the one or more memories 136 of control system 130, and control system 130 may store the propulsion switching data within the one or more memories 136 at 430. As another example, the propulsion switching data may be saved within a remote server, e.g., of a manufacturer of passenger vehicle 100 and/or drivetrain system 120, and control system 130 may transmit the propulsion switching data to the remote server via wireless communication system 160.

At 440, method 400 includes processing the propulsion switching data in order to determine an actual environmental impact of passenger vehicle 100 while passenger vehicle 100 operated on the roadway at 410. The actual environmental impact of passenger vehicle 100 from 440 may be used to assist manufacturer compliance with emission regulations, such as annual fleet average fuel economy and emission regulations. When the actual emission and efficiency performance of passenger vehicle 100 exceeds the tested performance of passenger vehicle 100, the actual environmental impact of passenger vehicle 100 from 440 may be used to evidence regulation compliance and/or for emissions credits. Moreover, a decrease in carbon dioxide emissions may be shown with the actual environmental impact of a fleet of passenger vehicles 100. For example, the manufacturer of passenger vehicle 100 may appeal the tested emissions with actual emissions testing conducted via method 400. Thus, method 400 may be implemented across fleet of vehicles to gather data for such fleet. Accordingly, the actual environmental impact for a plurality of vehicles may be accumulated using method 400 for each vehicle of the plurality of vehicles.

Figure 6:
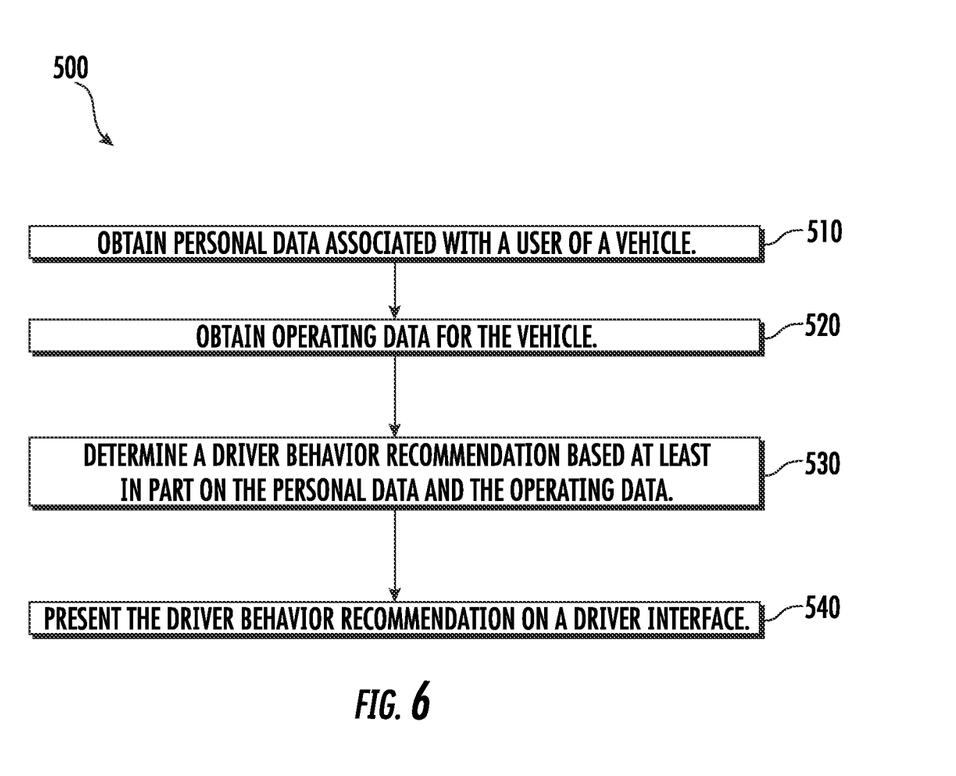
FIG. 6 is a flow diagram of a method for operating a vehicle according to another example embodiment of the present subject matter.

According to another example embodiment, the present subject matter may assist with encouraging environmentally friendly decision making by a driver of a vehicle. In particular, an example method 500 for operating a vehicle is illustrated in FIG. 6. Method 500 will generally be described with reference to passenger vehicle 100 described with reference to FIGS. 1 and 2, and control system 130 described with reference to FIG. 3. For instance, method 500 may be at least partially executed by computing device(s) 132 of control system 130. However, method 500 may be suitable for use with any other suitable type of vehicle, control system configuration, and/or vehicle system. In addition, although FIG. 6 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 510, method 500 includes obtaining personal data associated with the user of vehicle 100. The personal data may be associated with the driver of vehicle 100 and may be gathered over time by control system 130 during operation of vehicle 100 by the user. For example, the personal data may include user selected operating parameters for vehicle 100. Thus, e.g., with respect to the cabin environment system 152 of vehicle 100, the personal data may include whether the user opens the windows of vehicle 100 at certain ambient temperatures and/or vehicle speeds, whether the user operates the air conditioning system of vehicle 100 at certain ambient temperatures, whether the user operates the cabin heating system of vehicle 100 at certain ambient temperatures, whether the user operates a seat heater of vehicle 100 at certain ambient temperatures, etc. With respect to motor system 122 and/or transmission system 124 of vehicle 100, the personal data may include an average velocity of vehicle 100, e.g., in particular driving conditions, an average cruise control velocity of vehicle 100, e.g., in particular driving conditions, an average acceleration of vehicle 100, e.g., from standstill, etc. Such personal data may advantageously correspond to the preferred operating parameters of vehicle 100 under current operating conditions. Personal data may be unique to each user of vehicle 100 or may be an amalgam for two or more past users of vehicle 100. Control system 130 may gather the personal data during operation of vehicle 100, e.g., and store the personal data and/or transmit the personal data to a remote server. In certain example embodiments, the personal data may be stored within the one or more memories 136 of control system 130 or the remote server.

The personal data may correspond to the behavior of the user under certain operating conditions. As a particular example, the personal data may include a status of one or more windows of vehicle 100 (e.g., whether the window(s) is/are open or closed) at a respective ambient temperature and/or vehicle speed. Thus, e.g., the personal data may include that the user of vehicle prefers to operate vehicle 100 with window(s) of vehicle 100 open at certain ambient temperatures and/or vehicle speeds and/or that the user of vehicle prefers to operate vehicle 100 with window(s) of vehicle 100 closed at other, different ambient temperatures and/or vehicle speeds. As another example, the personal data may include a status of an air conditioning system of vehicle 100 (e.g., whether the air conditioning system is operating to cool cabin 112) at a respective ambient temperature. Thus, e.g., the personal data may include that the user of vehicle prefers to operate vehicle 100 with the air conditioning system operating to cool cabin 112 at certain ambient temperatures and/or that the user of vehicle prefers to operate vehicle 100 without the air conditioning system operating to cool cabin 112 at other, different ambient temperatures. As another example, the personal data may include a status of a cabin heating system of vehicle 100 (e.g., whether the cabin heating system is operating to heat cabin 112) at a respective ambient temperature. Thus, e.g., the personal data may include that the user of vehicle prefers to operate vehicle 100 with the cabin heating system operating to heat cabin 112 at certain ambient temperatures and/or that the user of vehicle prefers to operate vehicle 100 without the cabin heating system operating to heat cabin 112 at other, different ambient temperatures. As another example, the personal data may include a status of one or more seat heater(s) of vehicle 100 (e.g., whether the seat heater(s) is/are operating to heat seat(s)) at a respective ambient temperature. Thus, e.g., the personal data may include that the user of vehicle prefers to operate vehicle 100 with the seat heater(s) operating to heat seat(s) at certain ambient temperatures and/or that the user of vehicle prefers to operate vehicle 100 without the seat heater(s) operating to heat seat(s) at other, different ambient temperatures. As another example, the personal data may include an average velocity of vehicle 100, e.g., for various driving conditions. Thus, e.g., the personal data may include that the user of vehicle prefers to operate vehicle 100 at a relatively higher velocities at certain speed limits, road types, when the windows are closed, in daylight hours, when far from a destination, in good weather, etc., and/or that the user of vehicle prefers to operate vehicle 100 at relatively lower velocities at other, different speed limits, road types, when the windows are open, at night, when close to the destination, in bad weather, etc. As another example, the personal data may include an average selected cruise control velocity of vehicle 100. Thus, e.g., the personal data may include that the user of vehicle prefers to operate vehicle 100 with relatively higher selected cruise control velocities at certain speed limits, road types, when the windows are closed, in daylight hours, when far from a destination, in good weather, etc. and/or that the user of vehicle prefers to operate vehicle 100 at relatively lower selected cruise control velocities at other, different speed limits, road types, when the windows are open, at night, when close to the destination, in bad weather, etc. As another example, the personal data may include an average acceleration of vehicle 100 from standstill. Thus, e.g., the personal data may include that the user of vehicle prefers to quickly accelerate vehicle 100 at certain road types, when the windows are closed, in daylight hours, when far from a destination, in good weather, etc. and/or that the user of vehicle prefers to slowly accelerate vehicle 100 at other, different road types, when the windows are open, at night, when close to the destination, in bad weather, etc. As may be seen from the above, the personal data may correspond to behavioral preferences of the user of vehicle under various operating conditions for vehicle 100. Thus, the personal data may be collected at 510 to assist with identifying behavioral preferences of the user of vehicle 100.

It will be understood that the personal data described above is provided by way of example. Other personal data may be obtained at 510 in alternative example embodiments. For instance, the personal data may include a status of a heating element of a steering wheel of vehicle 100 (e.g., whether the heating element is operating to the steering wheel) at a respective ambient temperature. Thus, e.g., the personal data may include that the user of vehicle prefers to operate vehicle 100 with the heating element of the steering wheel at certain ambient temperatures and/or that the user of vehicle prefers to operate vehicle 100 without the heating element of the steering wheel at other, different ambient temperatures. The personal data may also include an average level of charge/fuel when the user of vehicle 100 typically charges/refuels vehicle 100, a location at which the user of vehicle 100 typically charges/refuels vehicle 100, and/or a time of day when the user of vehicle 100 typically charges/refuels vehicle 100. Thus, the personal data may include that the user of vehicle prefers to refuel the vehicle when the fuel level drops below a particular threshold volume and/or that the user of vehicle prefers to recharge the batteries of electrical accumulator system 126 when the charge level drops below a particular threshold charge level. As another example, the personal data may include when and/or where the user of vehicle prefers charge/fuel vehicle 100. The personal data may further include a list of preferred destinations and/or origins, such as a home address, a work address, a child-care address, etc. Thus, the personal data may include that user of vehicle 100 prefers to drive to certain destinations and/or depart from certain origins. The personal data may also include a preferred roadway, such as highways, streets, two-lane roads, four-lane roads, etc. Thus, the personal data may include that user of vehicle 100 prefers to drive on certain types of roadways. The personal data may further include behavioral preferences of other occupants of vehicle 100 besides the driver of vehicle 100. For instance, the personal data may also include preferences of other occupants, such as a spouse, child, or passenger. Again, the personal data may be collected at 510 to assist with identifying behavioral preferences of the user(s) of vehicle 100. The personal data at 510 may also include the personal data of other stakeholders beside a driver or other user of vehicle 100. For instance, a stakeholder, such as a fleet operator, may provide personal data regarding route, speed, conditions for turning systems on and off, etc.

Method 500 may include making the personal data available over a communication network, e.g., via wireless communication system 160. Thus, the personal data from 510 may be transmitted to control system 130, another phone, a social network, etc.

At 520, method 500 includes obtaining operating data for vehicle 100. The operating data may include the operating status for one or more systems of vehicle 100, such as motor system 122, transmission system 124, energy accumulator system 126, cabin environment system 152, etc. The operating data may also include the operating conditions for vehicle 100, such as the ambient temperature, the location of vehicle 100, the type of vehicle 100, etc. The operating data for vehicle 100 may correspond to the current operating data for vehicle 100, e.g., rather than historical data. Thus, e.g., with respect to the climate control system of vehicle 100, the operating data may include the current set temperature for cabin environment system 152, the current state of the windows of vehicle 100 (e.g., open of closed), the current operating status of the seat heater(s) of vehicle 100, etc. With respect to the powertrain system of vehicle 100, the operating data may include the current velocity of vehicle 100, the current cruise control set velocity of vehicle 100, the current charge state of energy accumulator system 126, etc. Such operating data may advantageously correspond to the current operating conditions for vehicle 100. Thus, such operating data may be used to suggest one or actions for the user of vehicle 100 to take in order to reduce the emissions of vehicle 100, as discussed in greater detail below. Control system 130 may gather the operating data during operation of vehicle 100, e.g., and store the operating data and/or transmit the operating data to a remote server.

At 530, method 500 includes determining a driver behavior recommendation to reduce the emissions of vehicle 100 based at least in part on the personal data from 510 and the operating data from 520. The driver of vehicle 100 may take various actions to assist with reducing the emissions of vehicle 100. For instance, the driver may decrease the velocity of passenger vehicle 100, may adjust cabin environment system 152 or open windows to decrease energy consumption of cabin environment system 152, may plug passenger vehicle 100 into a charging station upon arrival at a destination to charge electrical accumulator system 126, may command switching from internal combustion engine system 142 to electric machine system 140, etc. As an example, control system 130 may determine the driver behavior recommendation in order to reduce the emissions of vehicle 100 by increasing the usage of electric machine system 140 and decreasing the usage of internal combustion engine system 142 when the driver of passenger vehicle 100 implements the driver behavior recommendation.

Utilizing the personal data from 510 to assist with determining the driver behavior recommendation may advantageously increase a likelihood that the user of vehicle 100 will implement (or does not opt out of) the driver behavior recommendation. For example, the driver behavior recommendation may correspond to an action that is frequently performed by the user, such as decreasing the velocity of passenger vehicle 100, adjusting cabin environment system 152 and/or opening windows, plugging passenger vehicle 100 into a charging station, switching from internal combustion engine system 142 to electric machine system 140, etc., e.g., when vehicle 100 is operating with the current operating conditions, and the current operating conditions of vehicle 100 may be determined from the operating data of 520. As may be seen from the above, the personal data from 510 may allow the driver behavior recommendation to be determined based upon behavioral economics. Thus, the driver behavior recommendation may be personalized to the user of vehicle 100, and the driver behavior recommendation may be different between users even when vehicles are operating with the same current operating conditions. Moreover, the driver behavior recommendation may include gamification to increase participation, e.g., by challenging the user of vehicle 100 to implement the driver behavior recommendation and thus reduce the emissions of vehicle 100. The user of vehicle 100 may or may not realize that implementing the driver behavior recommendation reduces the emissions of vehicle 100. For instance, by sharing the driver behavior recommendation and/or the successfully completed status of the driver behavior recommendation on social media, environmental gaming and/or competition may encourage implementation of the driver behavior recommendation. Thus, e.g., method 500 may include establishing and using criteria for evaluating user of different vehicles 100 in reducing carbon dioxide emissions, fuel consumption, or another suitable metric by implementing the driver behavior recommendation(s), and users of various vehicles 100 may compete to successfully meet the criteria, with such competition also increasing the implementation of the driver behavior recommendation and thus encouraging environmentally friendly operation of vehicle(s) 100.

As a particular example, the driver behavior recommendation may be determined at 530 by identifying a behavioral preference for the user of vehicle 100 from the personal data from 510 that would result in a reduction of the emissions of vehicle 100 by modifying the current operating conditions for vehicle 100 that are indicated by the operating data from 520. For instance, the driver behavior recommendation may be determined at 530 to reduce a difference between the user preferred operating condition determined via the personal data from 510 and the current operating condition determined via the operating data from 520. Thus, the driver behavior recommendation may be determined at 530 to identify a potential change in the current operating conditions for vehicle 100 that matches the behavioral preference for the user of vehicle 100.

At 540, method 300 includes presenting the driver behavior recommendation from 530 on an interface. For example, control system 130 may present the driver behavior recommendation on information system 150. In particular, the driver behavior recommendation may be presented visually on a display of information system 150, audibly on a speaker of information system 150, and/or in any other suitable manner to inform the driver of passenger vehicle 100 of the driver behavior recommendation via information system 150. As another example, control system 130 may transmit the driver behavior recommendation to a computing device, such as a smartphone or tablet, via wireless communication system 160. For instance, a software application on the computing device of the driver may visually present the driver behavior recommendation on a display of the computing device, audibly present the driver behavior recommendation on a speaker of the computing device, etc. In certain example embodiments, the driver behavior recommendation may be automatically implemented by control system 130 unless the driver opts out of the driver behavior recommendation.

As noted above, the driver behavior recommendation can encourage the driver of passenger vehicle 100 to take actions which encourage switching from internal combustion engine system 142 to electric machine system 140 for propulsion of passenger vehicle 100. Thus, based at least in part on the driver behavior recommendation from 340, the driver of passenger vehicle 100 may adjust operation of passenger vehicle 100 to increase the usage of electric machine system 140 and decrease the usage of internal combustion engine system 142. For instance, the driver may decrease the speed of passenger vehicle 100, may adjust cabin environment system 152 to decrease energy consumption of cabin environment system 152, may plug passenger vehicle 100 into a charging station, may schedule servicing of electrical accumulator system 126, may command switching from internal combustion engine system 142 to electric machine system 140, etc. in response to receipt of the driver behavior recommendation. In certain example embodiments, the driver behavior recommendation may be automatically implemented by control system 130 unless the driver opts out of the driver behavior recommendation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Passenger vehicle
110 Body
112 Interior cabin
114 Doors
116 Wheels
120 Drivetrain system
122 Motor system
124 Transmission system
126 Electrical accumulator/storage system
128 Torque converter
129 Differential
130 Control system
132 Computing devices
134 Processors
136 Memories
138 Instructions 139 Data
140 Electric machine system
142 Internal combustion engine system
150 Information system
152 Cabin environment system
154 Navigation system
156 Positioning system
160 Wireless communications system
300 Method
400 Method
500 Method

What is claimed is:

1. A computer-implemented method for operating a vehicle, comprising:
   obtaining, with a computing system that comprises one or more computing devices, personal data associated with a user of the vehicle, the personal data corresponding to user selected operating parameters for the vehicle;
   obtaining, with the computing system, operating data for the vehicle, the operating data corresponding to an operating status for one or more of a plurality of systems of the vehicle and an operating condition for the vehicle;
   determining, by the computing system, a driver behavior recommendation to reduce emissions of the vehicle based at least in part on the personal data and the operating data, the driver behavior recommendation corresponding to instructions for the driver to implement one or more actions to adjust the operating status for the one or more of the plurality of systems of the vehicle or the operating condition for the vehicle to reduce the emissions of the vehicle while the driver is operating the vehicle; and
   presenting the driver behavior recommendation on an interface.

2. The method of claim 1, wherein the personal data is stored within a memory of the computing system.

3. The method of claim 1, wherein the personal data comprises a status of one or more windows of the vehicle at a respective ambient temperature and/or vehicle speed.

4. The method of claim 1, wherein the personal data comprises a status of an air conditioning system of the vehicle at a respective ambient temperature.

5. The method of claim 1, wherein the personal data comprises a status of a cabin heating system of the vehicle at a respective ambient temperature.

6. The method of claim 1, wherein the personal data comprises a status of one or more seat heaters of the vehicle at a respective ambient temperature.

7. The method of claim 1, wherein the personal data comprises an average velocity of the vehicle.

8. The method of claim 1, wherein the personal data comprises an average selected cruise control velocity of the vehicle.

9. The method of claim 1, wherein the personal data comprises an average acceleration of the vehicle.

10. The method of claim 1, wherein the operating data comprises a current operating status for one or more of system of the vehicle.

11. The method of claim 1, wherein the operating data comprises one or more of an ambient temperature, a location of the vehicle, a time of day, and a weather forecast.

12. The method of claim 1, wherein:
    the personal data comprises one or more of an average charge state of a battery of the vehicle, a location of a charging station, and a time of day when the user of the vehicle typically charges the vehicle;
    the operating data comprises a current charge state of the battery of the vehicle; and
    the driver behavior recommendation comprises charging the battery of the vehicle.

13. The method of claim 1, wherein determining the driver behavior recommendation comprises:
    determining, by the computing system, a user preferred operating condition of the vehicle from the personal data;
    identifying, by the computing system, a current operating condition of the vehicle from the operating data; and
    selecting, by the computing system, the driver behavior recommendation to reduce a difference between the user preferred operating condition and the current operating condition,
    wherein adjusting operation of the vehicle from the current operating condition to the user preferred operating condition reduces emissions of the vehicle.

14. The method of claim 1, wherein determining the driver behavior recommendation comprises determining, by the computing system, the driver behavior recommendation to reduce operation of an internal combustion engine.

15. The method of claim 1, wherein the interface comprises one or both of an infotainment monitor and a speaker within the vehicle.

16. The method of claim 1, wherein the interface comprises a software application on a computing device.

17. The method of claim 1, wherein the driver behavior recommendation comprises one or more of adjusting a speed of the vehicle, adjusting an operating state of an air conditioning system, adjusting an operating state of a seat heater, adjusting an operating state of a cabin heating system, adjusting an operating state of a window, and switching power flow from an internal combustion engine to an electric machine.

18. The method of claim 1, further comprising:
    determining a performance metric improvement of the vehicle resulting from implementation of the driver behavior recommendation; and
    sharing the performance metric improvement over a network.

19. The method of claim 1, further comprising, after presenting the driver behavior recommendation on the interface, adjusting the operating status for the one or more of the plurality of systems of the vehicle or the operating condition for the vehicle to reduce the emissions of the vehicle in response to a driver input while the driver is operating the vehicle.

20. The method of claim 1, further comprising, while the driver is operating the vehicle, automatically adjusting the operating status for the one or more of the plurality of systems of the vehicle or the operating condition for the vehicle to reduce the emissions of the vehicle when the driver does not opt out of the driver behavior recommendation.

* * * * *